J. E. DISHEROON.
VEHICLE SEAT.
APPLICATION FILED JUNE 10, 1919.

1,330,308.

Patented Feb. 10, 1920.

Inventor
J. E. Disheroon.

Witness

By
Attorneys

UNITED STATES PATENT OFFICE.

JOHN E. DISHEROON, OF MENA, ARKANSAS.

VEHICLE-SEAT.

1,330,308.  Specification of Letters Patent.  Patented Feb. 10, 1920.

Application filed June 10, 1919. Serial No. 303,247.

*To all whom it may concern:*

Be it known that I, JOHN E. DISHEROON, a citizen of the United States, residing at Mena, in the county of Polk and State of Arkansas, have invented a new and useful Vehicle-Seat, of which the following is a specification.

The present invention relates to vehicle seat shock absorbing springs, the principal object being to provide a construction which will prevent the seat and springs from shifting longitudinally but which will allow the seat to rebound vertically thus affording the usual shock absorbing qualities to the seat.

A further object of this invention resides in the provision of a support or bracket for the usual spring for the seat, the bracket being constructed so as to permit the same to be readily detached from the wagon and which will enable the same to be used with any spring construction.

Still another object of the invention is to provide a spring support of this character which effectively supports the springs and seat and at the same time allows a free vertical movement of the seat.

An additional object of the invention is to provide a construction of this character which is simple, which consists of few parts that may be readily assembled and disassembled, and which may be manufactured and placed on the market at a minimum cost.

With the above and other objects and advantages in mind the invention consists of combinations of elements, constructions and arrangements, and general assemblage the details of which will be hereinafter set forth in the appended claims, the invention being illustrated in the accompanying drawings, wherein:—

Figure 1:
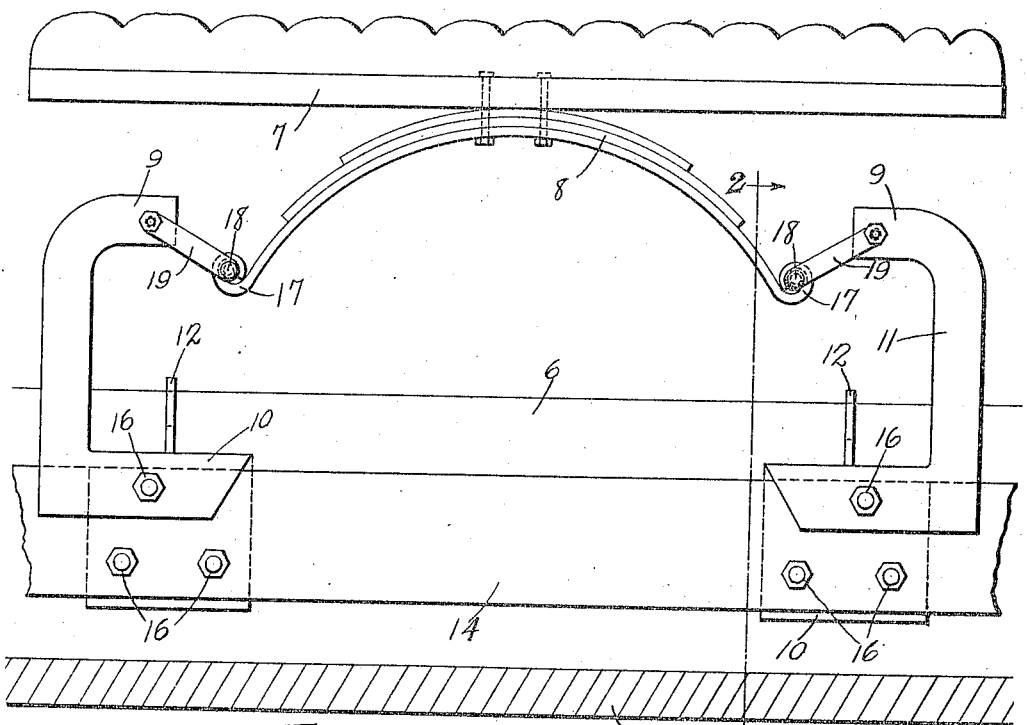
Figure 2:
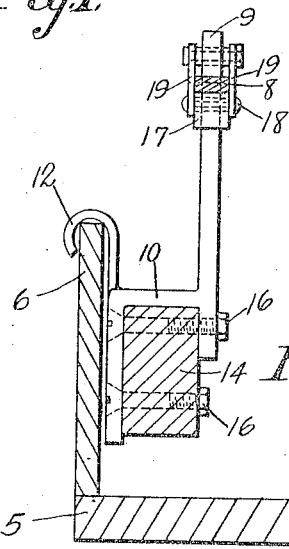

Figure 1 shows a side elevation of my improved vehicle seat mounting as applied to a vehicle; and Fig. 2 is an end elevation of one of the brackets supporting the spring construction, this view being taken on line 2—2 of Fig. 1.

Referring to the drawing by numerals of reference the numeral 5 designates a vehicle body of any desired construction which includes the side rail 6, the seat being designated at 7 and mounted on the usual leaf spring construction 8.

My improved spring and seat mounting includes a pair of identical castings which are arranged upon the side rails 6 below the longitudinal edges of the seat 7.

Each of these brackets includes an angle plate 10 from which extends a vertical standard or supporting arm 11 having its upper end extended laterally. These brackets are positioned upon the inner face of the sides 6 so that the hooks 12 carried by each of these brackets engage over the upper edge of the side rails. A bar 14 is also positioned against the inner face of the side rail 6 and engaged with the angle plate 10. Transversely extended bolts extend through the plate and bar and secure these parts together. These bolts are designated at 15 and have nuts 16 threaded upon the same.

The transverse ends of the lowermost spring construction 8 are bent reversely to provide an eye 17 at each end through which extends the pivot bolt 18. Links 19 are rigidly secured to the laterally extended ends of the supporting standards 9 upon the opposite faces thereof, the opposite ends of these links being pivoted on the bolt 18.

It will be seen that as the spring construction 8 is placed under a strain the links 19 will be free to rock thus allowing the seat to rebound vertically and at the same time retain the seat against shifting sidewise.

The construction herein shown is considered the preferred embodiment of the invention but it will be understood that the same is susceptible to various modifications and that my limits of such modification are governed only by what is claimed.

What is claimed is:—

1. The combination with a seat and a semi-elliptical spring secured intermediately to the bottom thereof and with its free ends extending downwardly; of a bar horizontally disposed, brackets having portions clipping over the bar and secured thereto, said brackets having means for suspending the same and the bar, upwardly and inwardly extended arms at the outer portions of the brackets, and pivotal connections between the ends of the spring and the upper ends of the arms.

2. In a vehicle seat, the combination with a side wall of a vehicle, of a pair of channel shaped plates arranged upon the inner face of the wall, an arm formed on each of the plates extended toward each other, a bar engaged with each of the channel shaped plates, means securing the bar to the plate, a seat, a shock absorbing spring for the seat, and links between the ends of the spring and the supporting arms.

3. In a vehicle seat construction, the combination with a vehicle, of a pair of brackets arranged upon the side walls of the vehicle, and each including a channel shaped plate, a bar received by the plate extending longitudinally of the side wall, bolts passing through the plate and bar, a seat, a spring suspended from the seat, eyes formed in the end of the spring, and links rigidly connected with the eyes and pivotally connected with the vertically extended arms.

In testimony that I claim the foregoing as my own, I have hereto affixed my signature.

JOHN E. DISHEROON.